US010877275B2

(12) United States Patent
Nakamura et al.

(10) Patent No.: US 10,877,275 B2
(45) Date of Patent: Dec. 29, 2020

(54) IMAGEGUIDE FOR HEAD MOUNTED DISPLAY

(71) Applicants: Hitachi, Ltd., Tokyo (JP); ARIZONA BOARD OF REGENTS ON BEHALF OF THE UNIVERSITY OF ARIZONA, Tucson, AZ (US)

(72) Inventors: Toshiteru Nakamura, Tokyo (JP); Yuzuru Takashima, Tucson, AZ (US)

(73) Assignees: HITACHI, LTD., Tokyo (JP); Arizona Board of Regents on Behalf of the University Of Arizona, Tucson, AZ (US)

( * ) Notice: Subject to any disclaimer, the term of this patent is extended or adjusted under 35 U.S.C. 154(b) by 382 days.

(21) Appl. No.: 15/897,385

(22) Filed: Feb. 15, 2018

(65) Prior Publication Data

US 2019/0250406 A1  Aug. 15, 2019

(51) Int. Cl.
*G02B 27/01* (2006.01)
*G02B 27/09* (2006.01)
*G03H 1/04* (2006.01)

(52) U.S. Cl.
CPC ..... *G02B 27/0172* (2013.01); *G02B 27/0944* (2013.01); *G03H 1/04* (2013.01)

(58) Field of Classification Search
CPC ... G02B 27/01–0189; G02B 2027/0105–0198; G03B 21/00–64; H04N 9/31–3197
See application file for complete search history.

(56) References Cited

U.S. PATENT DOCUMENTS

| 9,791,696 | B2 | 10/2017 | Woltman et al. | |
|---|---|---|---|---|
| 2010/0177388 | A1* | 7/2010 | Cohen | G02B 27/0081 359/566 |
| 2017/0003504 | A1* | 1/2017 | Vallius | G02B 27/0081 |
| 2017/0251201 | A1* | 8/2017 | Sissom | G02B 27/0172 |
| 2018/0172995 | A1* | 6/2018 | Lee | G02B 6/0035 |
| 2019/0114484 | A1* | 4/2019 | Keech | G02B 27/0081 |

FOREIGN PATENT DOCUMENTS

WO     2016/020643 A1    2/2016

* cited by examiner

*Primary Examiner* — Michelle M Iacoletti
*Assistant Examiner* — Christopher A Lamb, II
(74) *Attorney, Agent, or Firm* — Mattingly & Malur, PC

(57) ABSTRACT

An image guide comprising glass or plastic planar substrate, a first hologram area, a second hologram area, and a third hologram area which are formed on the substrate as surface relief grating, period and direction of diffraction structure of the first, second, and third hologram areas have a relationship which is a sum of grating vectors of the first, second, and third hologram areas becomes zero, depth of diffraction structure on the first hologram area is a uniform in the own hologram area, and depth of diffraction structure on the second or third hologram area is chirped in the own hologram area increases luminance and uniformity of virtual image.

18 Claims, 11 Drawing Sheets

IMAGEGUIDE FOR HEAD MOUNTED DISPLAY

BACKGROUND OF THE INVENTION

(1) Field of the Invention

The present invention relates to an image guide for head mounted display which displays a virtual image in the user's field of view.

(2) Description of Related Art

For example, U.S. Pat. No. 9,791,696-B2 discloses "An apparatus for use in replicating an image associated with an input-pupil to an output-pupil includes a planar optical waveguide including a bulk-substrate, and also including an input-coupler, an intermediate-component and an output-coupler. The input-coupler couples light corresponding to the image into the bulk-substrate and towards the intermediate-component."

An image guide which has transparent planar form displays a virtual image in the user's field of view by propagating signal light. The signal light propagating in the substrate of the image guide encounters a hologram area several times. Signal light loss by unexpected diffraction at the hologram area decreases the luminance of the image and luminance uniformity of the image.

For example, U.S. Pat. No. 9,791,696-B2 discloses "In certain embodiments, one or more of the input-coupler, the intermediate-component or the output-coupler comprises a liquid crystal polymer (LCP) based surface relief grating (SRG) or a double-side diffractive optical element (DOE), each of which can be used to improve an intensity distribution of light output by the output-coupler." as improvement method for luminance uniformity. However, this method is using liquid crystal polymer or double-side diffractive optical element which increases the cost of the image guide.

SUMMARY OF THE INVENTION

The present invention has been made given the above-described circumstances. An object of the present invention is to provide an image guide and a head-mounted display having the image guide which is low cost and has high luminance and high luminance uniformity of the virtual image.

The above-described object can be achieved by the configuration described, as an example, in the claims. The present invention includes several means for solving the above-described problems, but an example of these is an image guide comprising glass or plastic planar substrate, a first hologram area, a second hologram area, and a third hologram area which are formed on the substrate as surface relief grating, period and direction of diffraction structure of the first, second, and third hologram areas have a relationship which is a sum of grating vectors of the first, second, and third hologram areas becomes zero, depth of diffraction structure on the first hologram area is a uniform in the own hologram area, and depth of diffraction structure on the second or third hologram area is chirped in the own hologram area increases luminance and uniformity of virtual image.

According to the present invention, it is possible to provide an image guide and a head-mounted display using the image guide which is provided high luminance, high luminance uniformity at low cost.

Other objects, features and advantages of the invention will become apparent from the following description of the embodiments of the invention taken in conjunction with the accompanying drawings.

DESCRIPTION OF THE EMBODIMENTS

Figure 1:
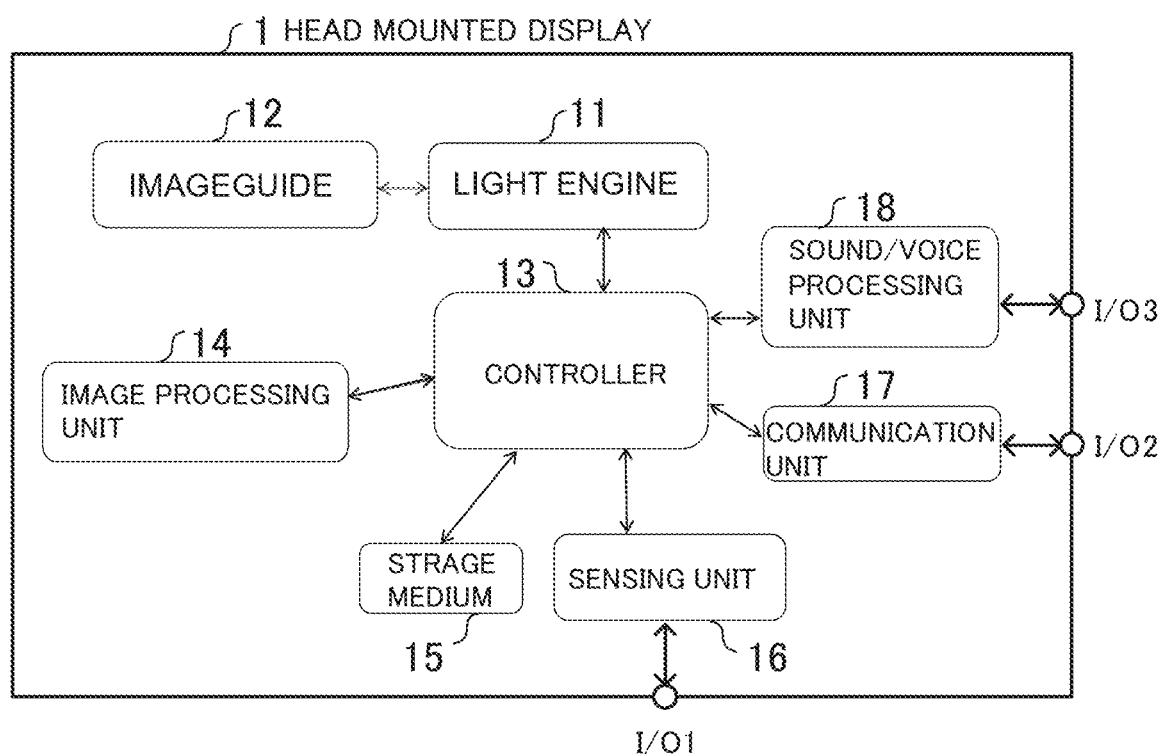
FIG. 1 is a schematic view showing a block diagram of a head-mounted display with an image guide in the present invention.

In the following, embodiments according to the present invention will be described with reference to the accompanying drawings.

First Embodiment

Examples of embodiments of an image guide using the present invention and a head mounted display provided with the image guide are described as follows. It should be noted that the present invention is not limited by the following description. Further, the same components in the figures are denoted by the same reference numerals.

FIG. 1 is a schematic view showing a block diagram of first embodiment of a head-mounted display with an image guide in the present invention.

Ahead-mounted display 1 is a see-through type head-mounted display and is mounted with a light engine 11, an image guide 12, a controller 13, an image processing unit 14, a storage medium 15, a sensing unit 16, communication unit 17, a sound/voice processing unit 18, an input/output section I/O1, I/O2, I/O3.

The light engine 11 is an apparatus such as a small size projector which has light sources, illumination optical system, micro-display and projection optical system, and projects magnified image of micro-display. The image guide 12 is a planar and transparent optical element which is mentioned in detail later. Signal light coming from the light engine 11 is coupled with image guide. The coupled signal light propagates in the image guide and is emitted from hologram area which is placed on the image guide to the user's eye. The user can recognize an image projected in the field of view when signal light couple with the user's eye.

The controller 13 comprehensively controls the head-mounted display 1. The controller 13 is a computing device such as CPU (Central Processing Unit). The image processing unit 14 produces an image signal to display the image on the micro-display mounted in the light engine 11 using information data acquired from storage medium 16 or communication unit 17.

The storage medium 15 is a memory device such as flash memory or RAM (Random Access Memory). The storage medium 15 has information which is needed to process at each part of the head-mounted display, and is generated at each part of the head-mounted display. Also, the storage medium 15 has programs and data which are used by the CPU.

Further, as the sensing unit 16, it is possible to mount a plurality of sensors including sensors, such as an inclination sensor and an acceleration sensor, which can detect posture and orientation, movement of the user; sensors, such as a sight line sensor and a temperature sensor, which detect physical conditions of the user; a GPS sensor which detects the present position of the user; sensors, such as a pressure-sensitive sensor and an electrostatic capacity sensor, which are used as an input-output I/F for detecting the instruction input by the user; and a proximity sensor, and the like, which detects that the head-mounted display is mounted or not by the user.

The communication unit 17 performs wireless communication with a network via the communication input/output section. For example, it is configured such that the head-mounted display 1 is directly connected to a base station such as the Internet, to acquire information, or such that the head-mounted display, provided with at least the imaging section and the display control section, communicates with an information terminal (smart phone, tablet-type terminal, PC, or the like) accommodated in another housing, by short/long-distance wireless communication, such as Bluetooth (registered trademark), Wi-Fi (registered trademark), UHF, VHF, and the like, and the information terminal performs the connection with the Internet, or the like, and main processes.

The sound/voice processing unit 18 denotes a voice input/output section corresponding to a microphone and an earphone.

Figure 2:
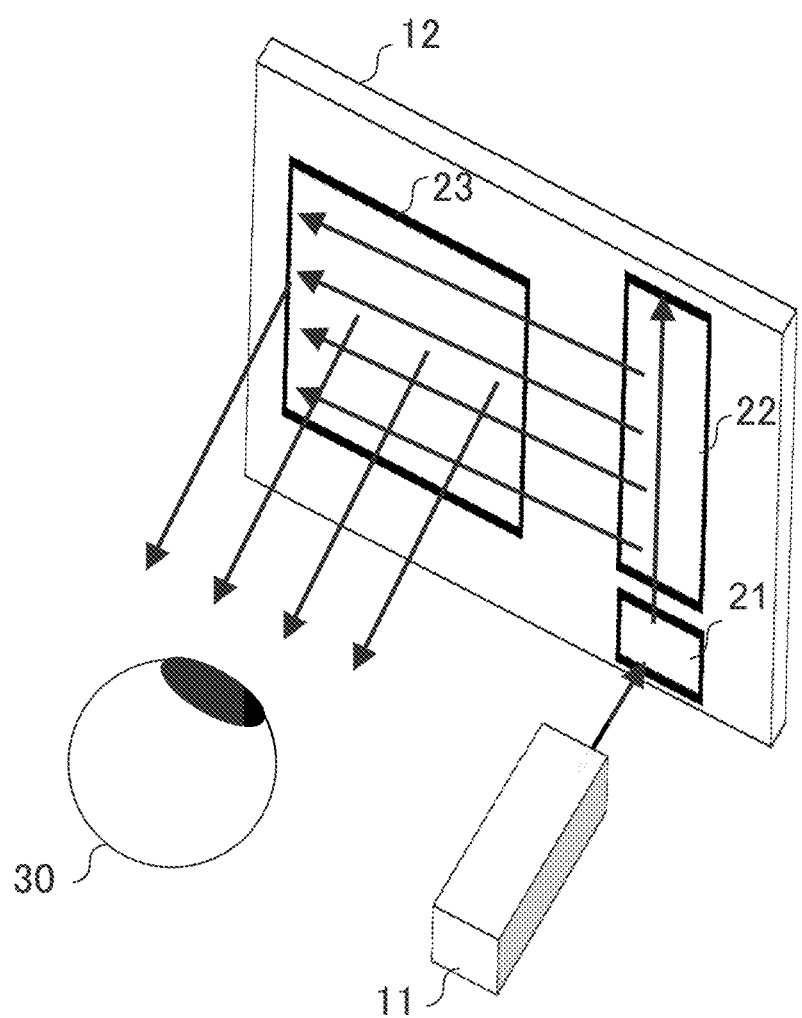
FIG. 2 is a schematic view showing a conventional image guide, light engine and user's eye.

FIG. 2 is a schematic view showing a conventional image guide 12 and light engine 11 and user's eye 30.

Signal light outputted from light engine 11 couples with first hologram area 21 and is captured inside of the image guide. Signal light in the image guide propagate to second hologram area 22 using total internal reflection (TIR). The second hologram area 22 expands the eye-box size along to vertical/horizontal direction. For example, the second hologram area 22 shown in FIG. 2 expands the vertical direction of the eye-box. The second hologram area 22 changes light propagation direction using diffraction and diffracted signal light propagates to third hologram area 23 in image guide substrate using TIR.

The third hologram area 23 expands the eye-box size along the horizontal/vertical direction. For example, the third hologram area 23 shown in FIG. 2 expands the horizontal direction of the eye-box. Also, the third hologram area 23 diffract signal light and the signal light are emitted to user's eye. Then, generally, grating vector k is defined by Eqn. (1)

$$k=2\pi/\Lambda \quad (1)$$

where, $\Lambda$ is the period of the hologram and the direction of the grating vector is along the vertical direction of the periodic structure of the hologram such as a groove of surface relief grating.

When the sum of a grating vector of the first hologram, a grating vector of the second hologram and a grating vector of the third hologram become zero, wave vector of the inputted signal light from the light engine and emitted signal light from the image guide are conserved. Thus, the emitted signal light become equal to the inputted signal light. Also, the user captures the signal light from the image guide and recognizes the virtual image in the field of view.

Figure 3A:
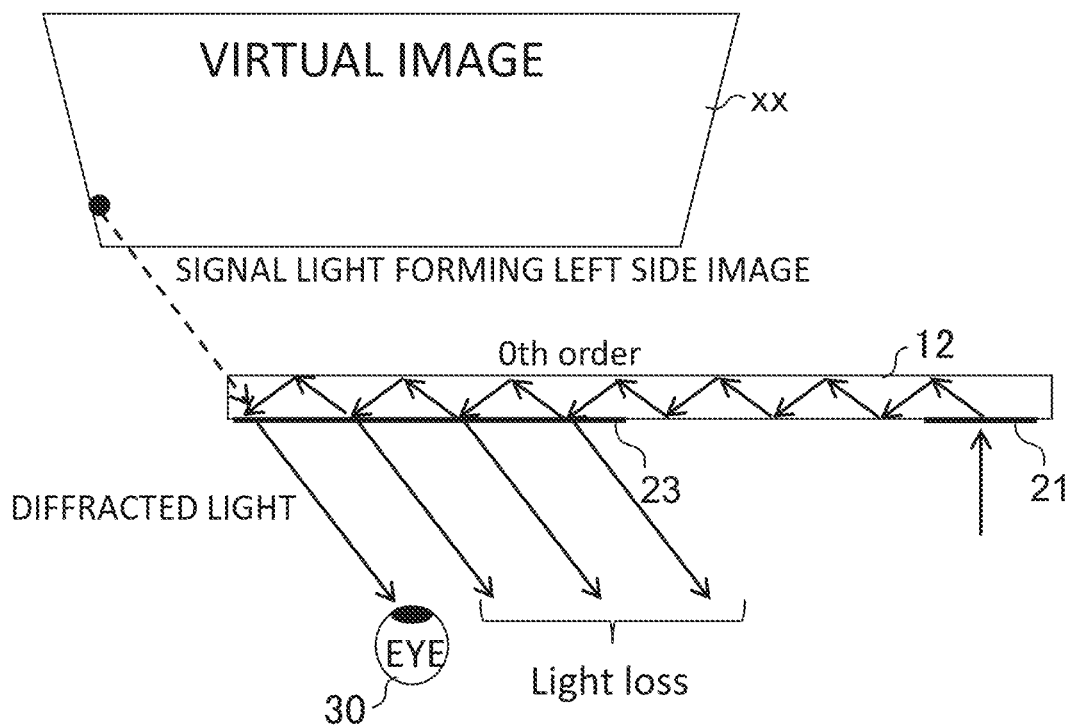
FIGS. 3A and 3B are a schematic view showing propagating signal light forming virtual image in a conventional image guide.

FIG. 3A is a schematic view showing propagating signal light forming the left side of the virtual image in a conventional image guide 12.

Figure 3B:
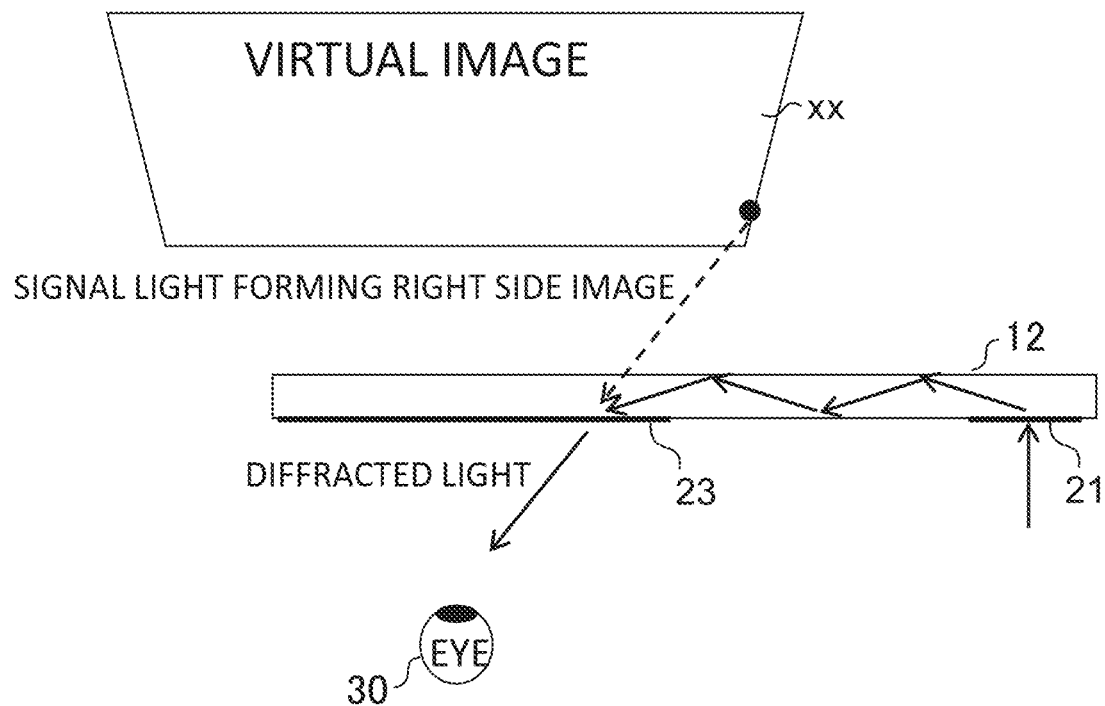

FIG. 3B is a schematic view showing propagating signal light forming the right side of the virtual image in a conventional image guide 12.

Both of FIGS. 3A and 3B are showing a sectional view of the image guide. Also, the second hologram area is not shown in both FIGS. 3A and 3B for simplicity.

The signal light coupled with the first hologram area 21 is propagate in the image guide substrate to the third hologram area 23 vis the second hologram is 22. The signal light forming the left side of the virtual image encounters the third hologram area 23 about ten to twenty times. Each encountering to the third hologram area generates diffraction light which is not captured by the user's eye and it becomes light loss.

On the other hand, the signal light forming the right side of the virtual image has a less chance of encountering the third hologram area 23 and has less light loss principally. Thus, luminance uniformity of the virtual image projected by the image guide is decreased by the difference of propagation in the image guide previously mentioned.

For example, FIG. 3 is showing a schematic diagram of the image guide in which the third hologram area 23 is placed to the left side of the first and the second hologram areas. It is possible to modify the position of the first to the third hologram areas on the image guide. For example, the third hologram area may be placed to the right, bottom or upper side of the first and the second hologram areas.

In this case, luminance uniformity is decreased according to the geometrical relationship of each hologram area. Therefore, the light loss occurs along to direction from the first hologram area to the second hologram area and direction from the second hologram to the third hologram.

Figure 4:
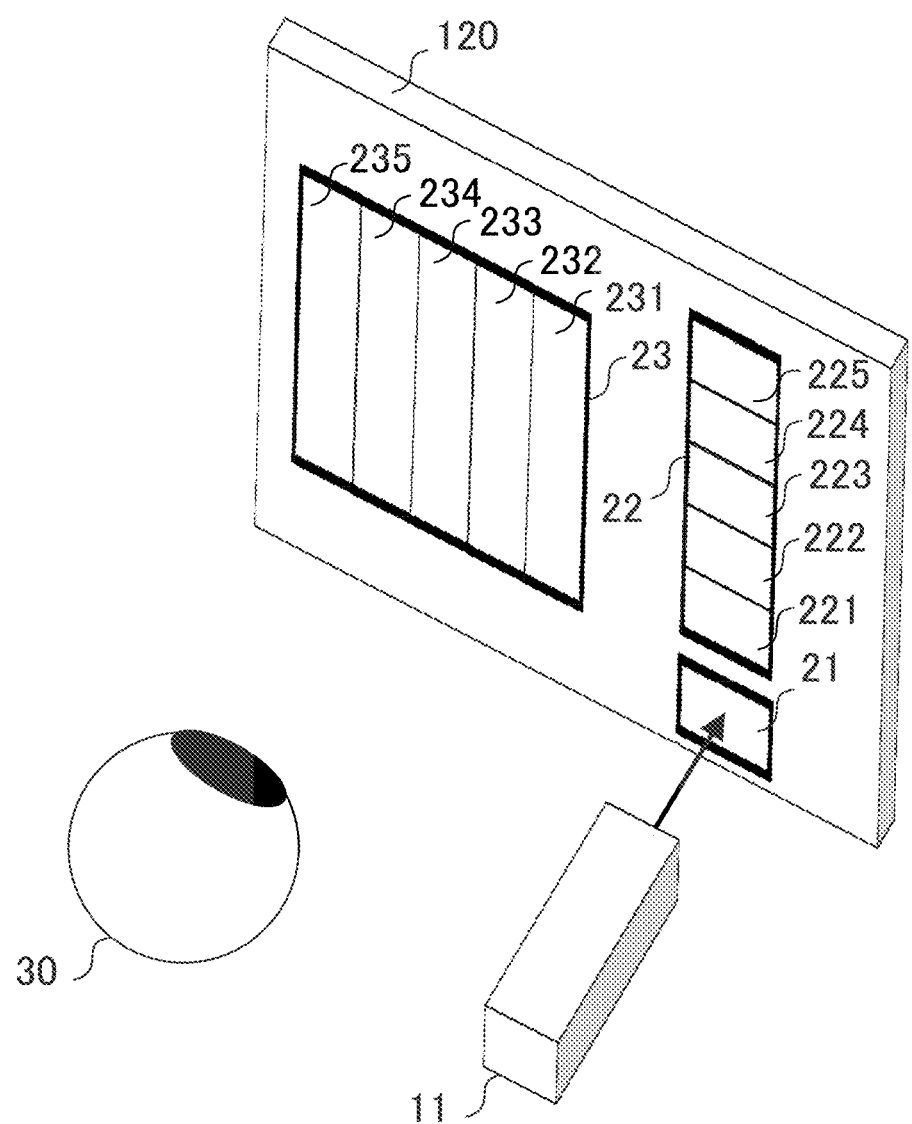
FIG. 4 is a schematic view showing a present invention image guide which has diffraction efficiency chirping structure.

FIG. 4 is a schematic view showing a present invention image guide 120 which has diffraction efficiency chirping structure.

The diffraction efficiency chirping structure provides improvement of luminance and luminance uniformity. The image guide 120 has the second and third hologram areas that are divided into multiple areas. For example, the second hologram area 22 is divided into five multiple areas 221 to 225. Also, the third hologram area 23 is divided into five multiple areas 231 to 235. Each of the divided areas has different diffraction efficiency characteristics. It reduces the light loss while propagating in the image guide 120 and improves luminance and uniformity.

As mentioned above, the light loss occurs along to direction from the first hologram area to the second hologram area and direction from the second hologram to the third hologram. Thus, the second hologram area 22 is divided into multiple areas vertically in the direction from the first hologram area to the second hologram area. Also, the third hologram area 23 is divided into multiple areas vertically in the direction from the second hologram area to the third hologram area.

It is possible for the first, second, and third hologram areas to have the diffraction efficiency chirping structure to be formed on the same surface of the image guide. It is not necessary to form the hologram areas on both side of the image guide to increase luminance and uniformity. It is possible for the embodiments in the present invention to achieve a decrease in the manufacturing cost.

The second and third hologram areas divided into five areas are explained as an example but it is possible to divide more than five areas or less than five areas. Also, it is possible to chirp (modulate) diffraction efficiency continuously according to position in the second or third hologram areas.

The hologram areas on the image guide 120 are surface relief grating or volumetric hologram. Grating depth chirping is a method to change diffraction efficiency for surface relief grating. That is, an image guide comprising glass or plastic planar substrate, a first hologram area, a second hologram area, and a third hologram area which are formed on the substrate as surface relief grating, period and direction of diffraction structure of the first, second, and third hologram areas have a relationship which is a sum of grating vectors of the first, second, and third hologram areas becomes zero, depth of diffraction structure on the first hologram area is a uniform in the own hologram area, and depth of diffraction structure on the second or third hologram area is chirped in the own hologram area increases luminance and uniformity of virtual image.

For a volumetric hologram, the amplitude of refractive index modulation in the volumetric hologram medium is a method of changing diffraction efficiency for the volumetric hologram.

Therefore, in the case of surface relief grating, each area of divided the second and third hologram areas 221, 222, 223, 224, 225, 231, 232, 233, 234, and 235 has different grating depth. Also, the surface relief gratings are used blazed grating to concentrate signal light to specific diffraction order to increase through put optical efficiency of the image guide.

Figure 5A:
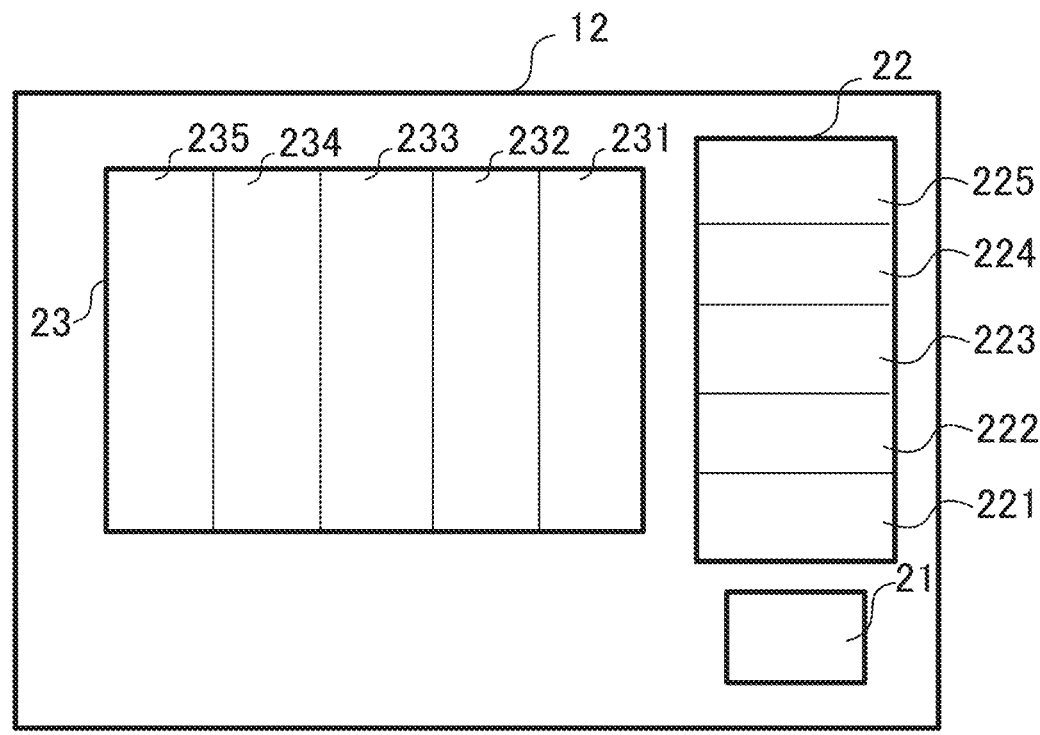
FIGS. 5A, 5B, 5C, 5D, 5E, and 5F are a schematic view showing modified example of the diffraction efficiency chirping image guide.
Figure 5B:
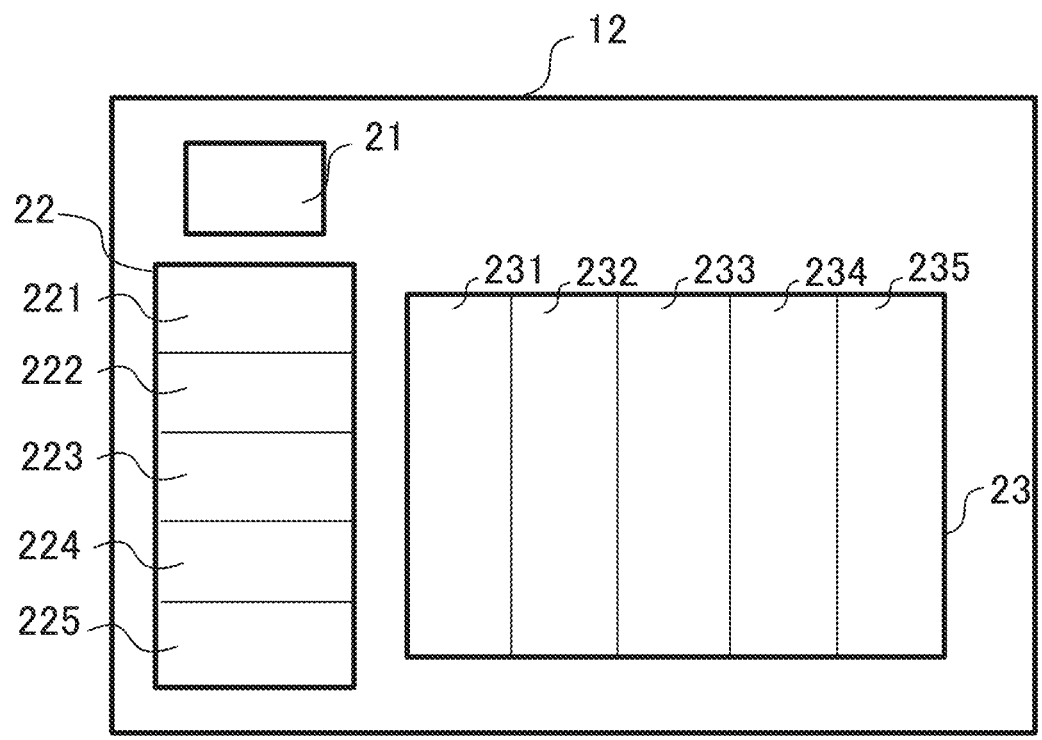
Figure 5C:
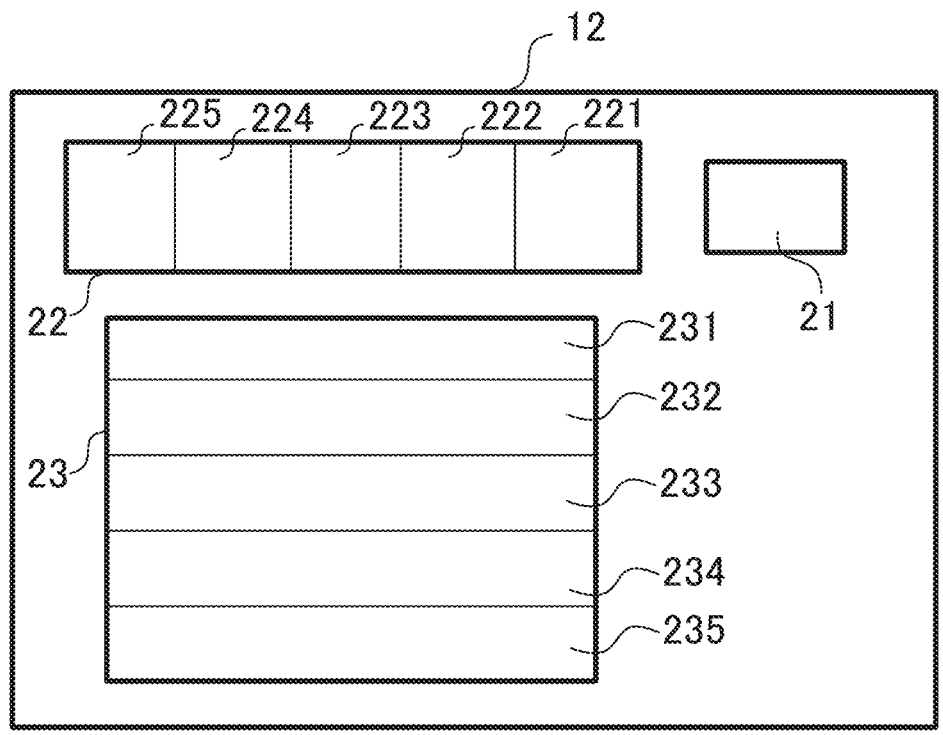
Figure 5D:
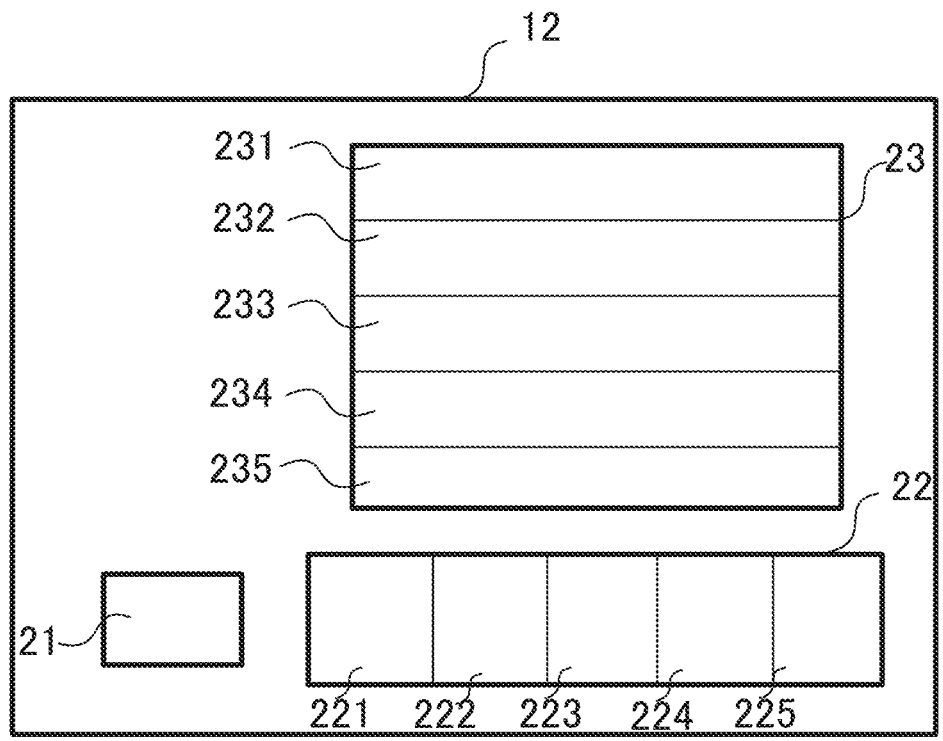

FIGS. 5A, 5B, 5C, 5D, 5E, and 5F is a schematic view showing a modified example of the diffraction efficiency chirping image guide 120. FIG. 5A shows the image guide 120 representing the model mentioned above. FIG. 5B shows a case where the arrangement relationship between the second and third hologram area and the first hologram area is inverted vertically and horizontally. FIG. 5C shows a case where the second hologram area is arranged upper side of the third hologram area and the first hologram area is arranged right side of the second hologram area. FIG. 5D shows a case where the arrangement relationship between the first and second hologram area and the third hologram area is inverted vertically and horizontally.

Figure 5E:
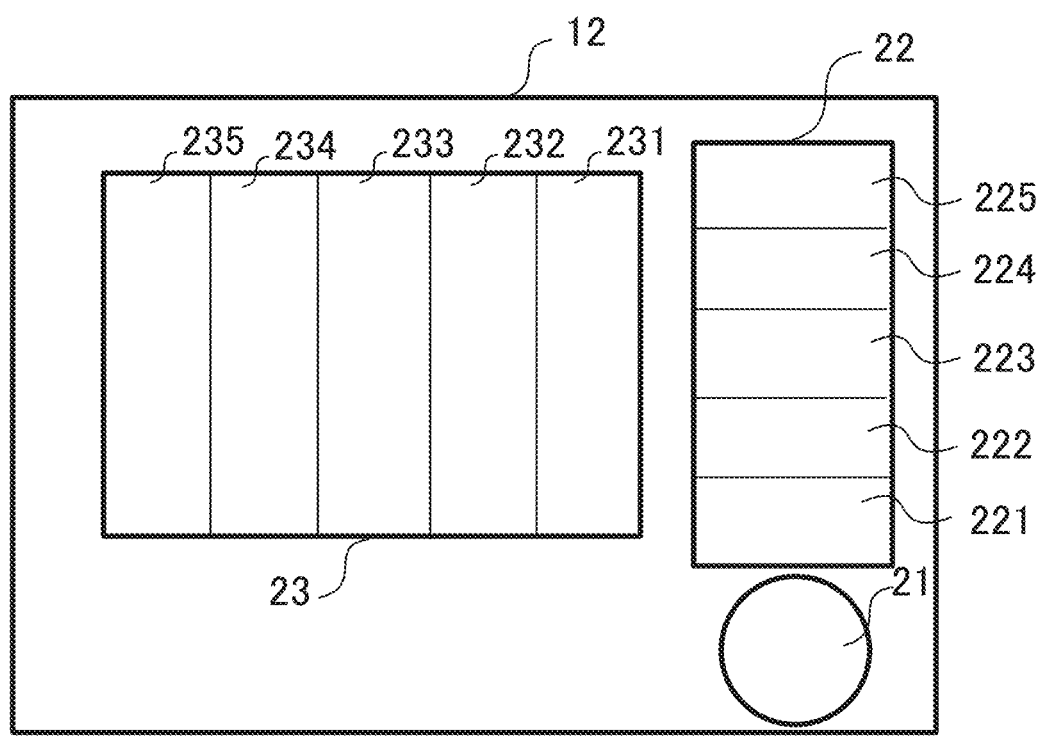
Figure 5F:
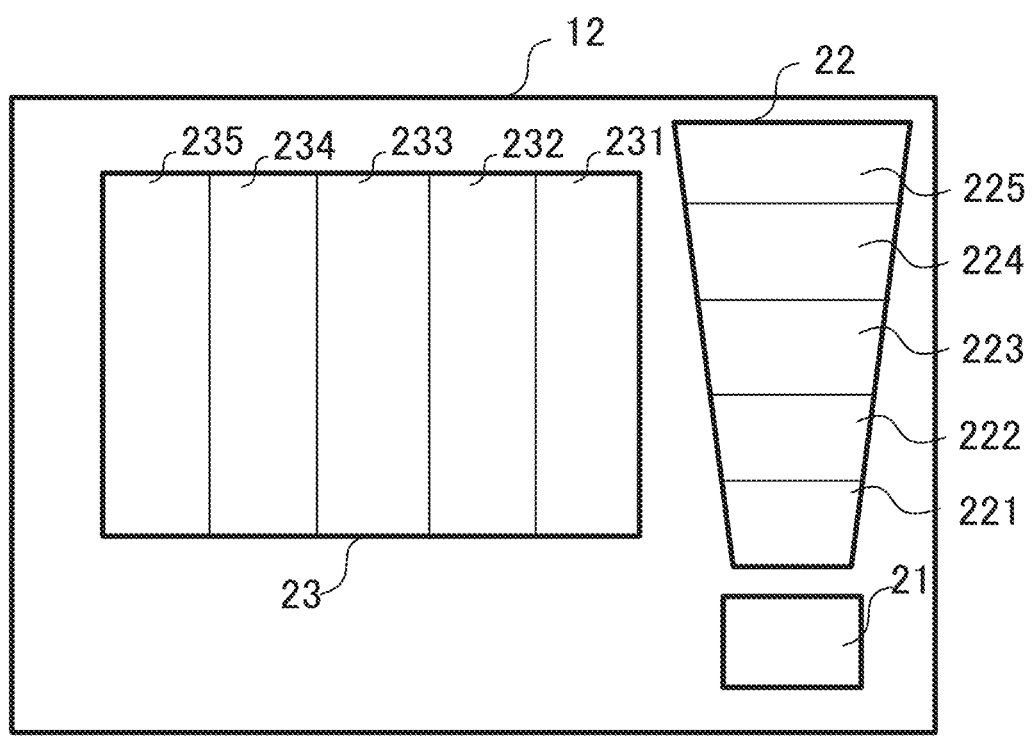

Also, each hologram area has to be a square shape. FIG. 5E shows a case where the first hologram has circle shape since generally, the exit pupil of the light engine has circle shape. Each hologram area is possible to be ellipse or trapezoid. FIG. 5F shows a case where the second hologram has trapezoid shape since considering signal light propagating pass which has a wider propagating area far from the first hologram area. Thus, its structure provides high throughput—optical efficiency of the image guide 120.

Second Embodiment

A second embodiment will be modified example of a diffraction efficiency chirping image guide 120 mentioned in the first embodiment. The present embodiment has almost the same functions as the first embodiment but parts of the function are different. In the drawings, components with the same functions are denoted by the same reference characters.

Figure 6:
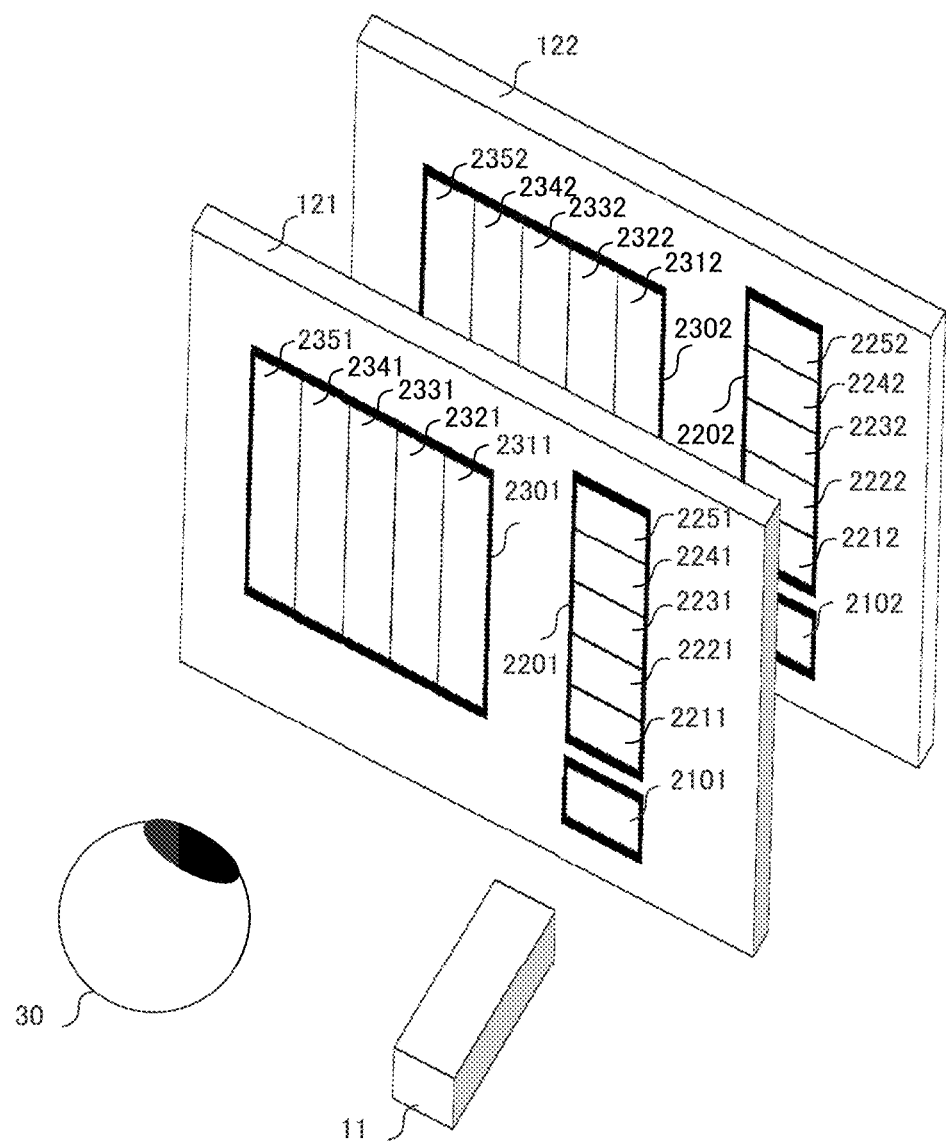
FIG. 6 is schematic view showing double layered image guide.

Multi layered image guide where the propagating layer is separated by color signal light is effective to propagate full-color signal light in the image guide since large wavelength dependence of surface relief grating. FIG. 6 is a schematic view showing a double-layered image guide. That is, the image guide has a multi-layered structure that has multiple image guide substrates forming the first, second and third hologram areas that are stacked. In the examination by the inventor, considering diffraction characteristics of surface relief grating, a first image guide (first light propagating layer) 121 which propagates blue to green signal light is placed near the side of the eye and a second image guide (second light propagating layer) which propagates green to red signal light is placed behind the first image guide. Blue to green signal light coupled with the first hologram area on the first image guide 2101 propagates to the divided second hologram area 2201 which is divided into five multiple areas 2211, 2221, 2231, 2241, and 2251. After diffracted signal light at the second hologram area 2201, signal light propagates into the divided third hologram area 2301 which is divided into five multiple areas 2311, 2321, 2331, 2341, and 2351. Emitted signal light by the divided third hologram area 2301 goes into the user's eye 30.

Green to red signal light which transmits the first hologram area 2102 on the first image guide 121 couple with a first hologram area 2102 on the second image guide 122. Coupled green to red signal light propagate to the divided second hologram area 2202 which is divided to five multiple areas 2212, 2222, 2232, 2242, and 2252. After diffracted signal light at the second hologram area 2202, signal light propagates to divided third hologram area 2302 which is divided to five multiple areas 2312, 2322, 2332, 2342, and 2352. Emitted signal light by the divided third hologram area 2302 passed through 2301 and goes into the user's eye 30. Generally, the refractive index of glass materials and plastic materials are 1.5 to 2.0. The first order of diffraction efficiency of the second and third depth chirping hologram area may be within 3% to 30% to achieve practical luminance and uniformity. Diffraction efficiency depends on grating depth. Too shallow or deep depth of grating is difficult to manufacture. Thus, the grating depth of the second and third hologram areas of multi-layered and depth chirping image guide may be within 30 nm to 150 nm.

The first image guide layer and the second image guide layer have different grating depth at each hologram area because the wavelength of propagating light is different in each image guide layer. The grating depth of the first image guide layer may be within 30 nm to 120 nm. Also, the grating depth of the second image guide layer may be within 60 nm to 150 nm. The range of grating depth previously mentioned, the deeper grating depth provides higher diffraction efficiency. To increase luminance uniformity, the grating depth gradually deepens from one area of the divided second hologram area 2211 or 2212 which is closest area to the first hologram area 2101 or 2102 to one area of the divided second hologram area 2251 or 2252 which is farthest area to the first hologram area 2101 or 2102. Also, the grating depth gradually deepens from one area of the divided third hologram area 2311 or 2312 which is closest area to the second hologram area 2201 or 2202 to one area of the divided third hologram area which is farthest area to the second hologram area 2351 or 2352 to increase luminance and uniformity.

As mentioned above, it is possible to change grating depth continuously in the second or third hologram area. Thus, the grating depth of the second hologram area gradually deepens along to direction from the first hologram area to the second hologram area. Also, the grating depth of the third hologram area gradually deepens along to direction from the second hologram area to the third hologram area.

a ratio of deepest grating depth and shallowest grating depth in the continuously depth chirping second hologram area 2301 or 2302 may be within the range of 1.2 to 1.5. Also, a ratio of the deepest grating depth and the shallowest grating depth in the continuous depth chirping third hologram area 2201 or 2202 may be within the range of 1.4 to 1.9.

By the way, it is difficult to obtain good enough diffraction efficiency with small angle of incidence. In a range of field of view affected by one area of the divided second hologram area which is the closest area to the first hologram area 2211 or 2212, signal light has small angle of incidence in the image guide and that factor decreases diffraction efficiency. There, these areas can a have higher grating depth to increase diffraction efficiency and luminance uniformity.

Therefore, grating depth of one area of the divided second hologram area 2221 or 2222 which is second closest area to the first hologram area 2101 or 2102 may be shallower than one area of the divided second hologram area 2211 or 2212 which is closest area to the first hologram area 2101 or 2102 and grating depth may gradually deepen from one area of the divided second hologram area 2221 or 2222 which is second closest area to the first hologram area 2101 or 2102 to one area of the divided second hologram 2251 or 2252 area which is farthest area to the first hologram area 2201 or 2202.

Alternatively, it is possible to be that grating depth may gradually become more shallow from one area of the divided second hologram area 2211 or 2212 which is closest area to the first hologram area 2101 or 2102 to one area of the divided second hologram area 2231 or 2232 which is center of the second hologram area 2201 and grating depth may gradually deepen from the center area of the divided second hologram area 2231 or 2232 to one area of the divided second hologram area 2251 or 2252 which is farthest area to the first hologram area 2101 or 2102.

Similar phenomena occur at third hologram area 2301 or 2302. There, grating depth of one area of the divided third hologram area 2321 or 2322 which is second closest area to the second hologram area 2201 or 2202 may be shallower than one area of the divided third hologram area 2311 or 2312 which is closest area to the second hologram area 2201 or 2202 and grating depth may gradually deepen from one area of the divided third hologram area 2321 or 2322 which is second closest area to the second hologram area 2201 or 2202 to one area of the divided third hologram area 2351 or 2352 which is the farthest area from the second hologram area 2201 or 2202.

Alternatively, it is possible that the grating depth may gradually become more shallow from one area of the divided third hologram area 2311 or 2312 which is the closest area to the second hologram area 2201 or 2202 to the center area of the third hologram area 2331 or 2332 and the grating depth may gradually deepen from the center area of the divided third hologram area 2331 or 2332 to one area of the divided third hologram area 2351 or 2352 which is the farthest area from the second hologram area 2201 or 2202.

As mentioned above, it is possible to change grating depth continuously in the second or third hologram area. Here, a length of L1 is defined as the length of the second hologram area along the direction of the first hologram area to the second hologram area. One area of the divided second hologram area 2221 or 2222 which is second closest to the area of the first hologram area is placed at 20% to 40% of the L1 position. Also, the center of the second hologram area is considered to be at 50% of the L1 position. Thus, the grating depth of the second hologram area may gradually become more shallow from an edge that is nearest to the first hologram area (0% of L1) to 20% to 50% of the L1 position and the grating depth may gradually deepen from 20% to 50% of the L1 position to the farthest edge (100% of L1) to the first hologram area.

Similarly, a length of L2 is defined as length of the third hologram area along the direction of the second hologram area to the third hologram area. One area of the divided third hologram area 2321 or 2322 which is the second closest area to the second hologram area is placed at 20% to 40% of the L2 position. Also, the center of the third hologram area is considered to be at 50% of the L2 position. Thus, the grating depth of the third hologram area may gradually become more shallow from an edge that is nearest to the second hologram area (0% of L2) to 20% to 50% of the L2 position. Also, the grating depth may gradually deepen from 20% to 50% of the L2 position to the farthest edge (100% of L2) to the second hologram area.

In other words, a practical grating depth ratio between each of divided hologram area will be explained. A ratio of deepest grating depth and shallowest grating depth at the divided second hologram areas 2211, 2221, 2231, 2241, and 2251 on the first image guide may be within a range of 1.2 to 1.5. Also, a ratio of deepest grating depth and shallowest grating depth at the divided second hologram areas 2212, 2222, 2232, 2242, and 2252 on the second image guide may be within a range of 1.2 to 1.5.

Similarly, a ratio of deepest grating depth and shallowest grating depth at the divided third hologram areas 2311, 2321, 2331, 2341, and 2351 on the first image guide may be within the range of 1.4 to 1.9. Also, a ratio of deepest grating depth and shallowest grating depth at the divided third hologram areas 2312, 2322, 2332, 2342, and 2352 on the first image guide may be within the range of 1.4 to 1.9.

As mentioned above, it is possible to change the grating depth continuously in the second or third hologram area. Thus, a ratio of the deepest grating depth and the shallowest grating depth in the continuous depth chirping second hologram areas 2301 or 2302 may be within a range of 1.2 to 1.5. Also, a ratio of the deepest grating depth and the shallowest grating depth in the continuous depth chirping second hologram areas 2201 or 2202 may be within a range of 1.4 to 1.9.

The hologram areas divided into 5 areas were explained as an example but it is possible to increase or decrease the division number. The divided hologram areas having diffraction chirping structure provide increasing of luminance and uniformity. Grating depth change patterns were explained. It is not necessary to set the same pattern for all of the layers of the image guide and each layer of the image guide can have different grating depth change pattern.

Also, a ratio of the grating depth of the first hologram area on the first image guide and the grating depth of the first hologram area on the second image guide may be within 1.28 to 1.43 according to a ratio of mainly propagating wavelength of each image guide layer. Generally, the dominant wavelength of the blue signal light which propagates in the first image guide is 440 nm to 470 nm. Also, the dominant wavelength of the blue signal light which propagate in the first image guide is 600 nm to 630 nm.

Figure 7:
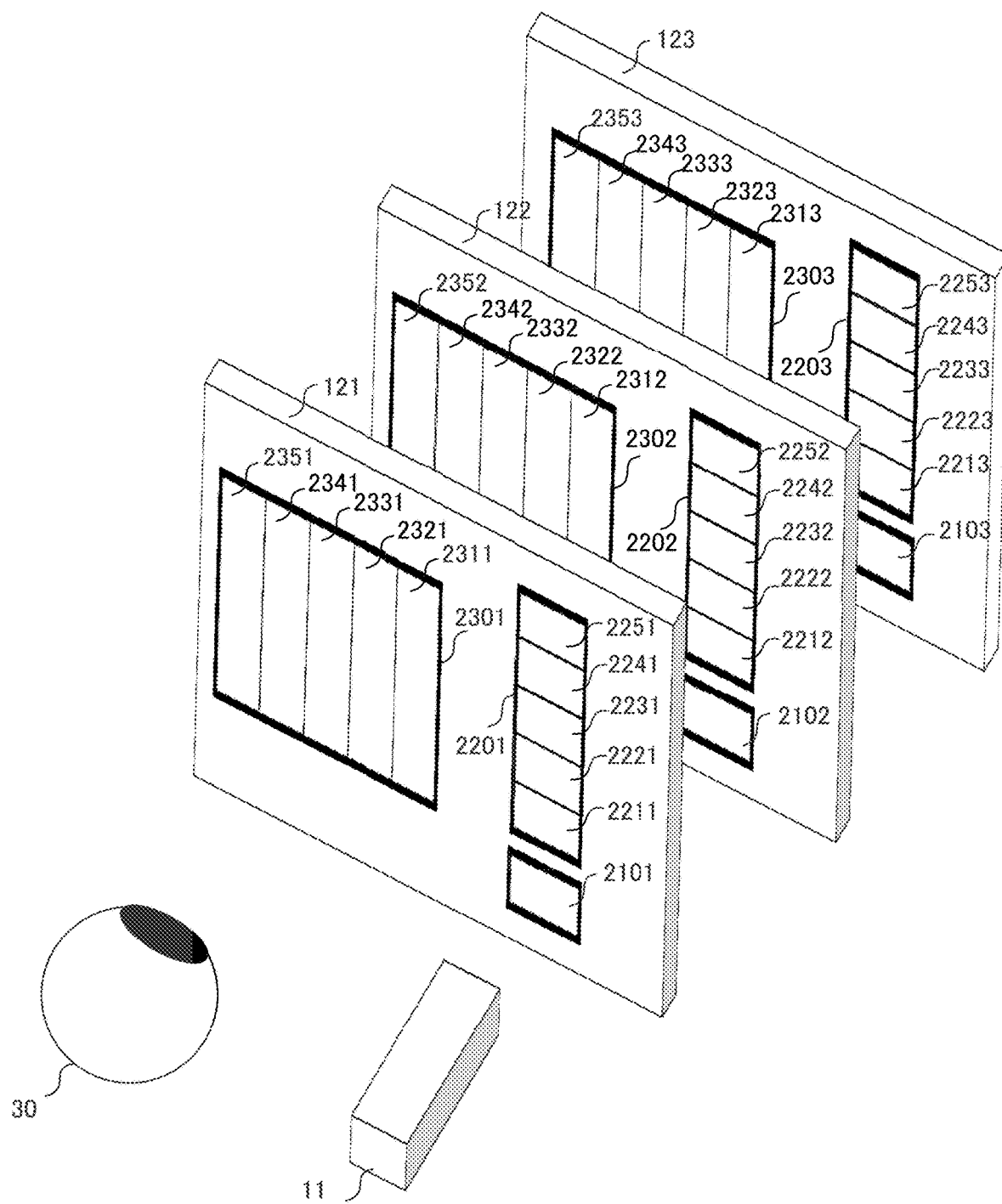
FIG. 7 is schematic view showing three layered image guide.

FIG. 7 is schematic view showing a three-layered image guide. In this case, blue, green and red propagating layer may be a different layer. Considering the characteristic of the first hologram area and the third hologram area, blue signal light propagating layer is placed near the eye side and the green signal propagating layer is placed behind the blue layer and the red signal propagating layer is placed behind the green layer.

Thus, blue signal light couple with the first hologram area 2101 on the first image guide 121 and propagate to the divided second hologram area 2201 which is divided into five multiple areas 2211, 2221, 2231, 2241, and 2251. After diffracted signal light at the second hologram area 2201, signal light propagates to the divided third hologram area 2301 which is divided into five multiple areas 2311, 2321, 2331, 2341, and 2351. Emitted signal light by the divided third hologram area 2301 goes into the eye 30. Green signal light which transmits the first hologram area 2101 on the first image guide 121 couple with a first hologram area 2102 on the second image guide 122. Coupled green signal light propagates to the divided second hologram area 2202 which is divided into five multiple areas 2212, 2222, 2232, 2242, and 2252. After diffracted signal light at the second hologram area 2202, signal light propagates to the divided third hologram area 2302 which is divided into five multiple areas 2312, 2322, 2332, 2342, and 2352. Emitted signal light by the divided third hologram area 2302 passes through the hologram area 2301 and goes into the eye 30. Red signal light which transmit the first hologram area 2101 on the first image guide 2101 and the first hologram area 2102 on the second image guide 122 couple with a first hologram area 2103 on the third image guide 123. Coupled red signal light propagates to the divided second hologram area 2203 which is divided into five multiple areas 2213, 2223, 2233, 2243, and 2253. After diffracted signal light is at the second hologram area 2203, signal light propagates to the divided third hologram area 2303 which is divided into five multiple areas 2313, 2323, 2333, 2343, and 2353. Emitted signal light at the divided third hologram area 2303 passes through the hologram area 2301 and 2302 and goes into the eye 30.

Figure 8:
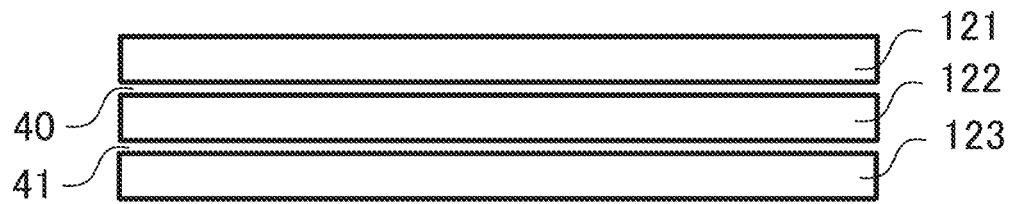
FIG. 8 is schematic view showing sectional view of the multi layered image guide.

FIG. 8 is schematic view showing sectional view of the multi-layered image guide. There is a minute air gap 40 between the first layer of the image guide and the second layer of the image guide. Also, there is a minute air gap 41 between the second layer of the image guide and the third layer of the image guide. These air gaps confine each color of the signal light inside the image guide layer and the signal light propagates using TIR.

As mentioned above, the head-mounted display has the image guide explained with the first and second embodiments of the light engine. The head-mounted display having the image guide of the invention has increased luminance and uniformity of virtual image.

In the above, the embodiments of the image guide, and of the head-mounted display using the image guide, according to the present invention, are described, but the present invention is not limited to the above-described embodiments, and various variations are possible within the scope and spirit of the invention. That is, the embodiments described above have been described in detail so as to better illustrate the present invention and are not intended to be necessarily limited to include all the configurations described above. Further, a part of one of the embodiments described above can be replaced by a part of the configuration of the other embodiment, and also one of the embodiments described above can be additionally provided with a part of the configuration of the other embodiment. Further, for some of the configuration of each of the embodiments, the addition, deletion, and substitution of the configuration of the other embodiment are possible.

It is possible to achieve each component, function, processing unit by a hardware such as designed integrated circuit. All of the control lines and the information lines are not shown in the above figures and also the control lines and the information lines needed to explain the embodiments are shown in the above figures. It is possible to consider all of the components mentioned above are connected.

Above functional configurations such as the head-mounted display, image guide and light engine are classified to make understanding easier. Classification methods and names should not restrict the present invention.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image guide comprising:
a glass or plastic planar substrate;
a first hologram area, a second hologram area, and a third hologram area, which are formed on the substrate as surface relief grating; and
a period and a direction of a diffraction structure of the first, second, and third hologram areas have a relationship which is a sum of grating vectors of the first, second, and third hologram areas becomes zero,
wherein a depth of diffraction structure on the first hologram area is uniform in the first hologram area,
wherein a depth of diffraction structure on the second or third hologram area is chirped in the second or third hologram area,
wherein a length of L1 is defined as a length of the second hologram area along and to a direction of the first hologram area to the second hologram area, and a length of L2 is defined as a length of the third hologram area along and to a direction of the second hologram area to the third hologram area,
wherein a grating depth of the second hologram area becomes gradually shallower from an edge that is nearest to the first hologram area to a position at 20% to 50% of L1 measured from a nearest edge,
wherein the grating depth of the second hologram area gradually increases from the position at 20% to 50% of L1 measured from the nearest edge, towards a farthest edge against the first hologram area,
wherein a grating depth of the third hologram area gradually decreases from an edge that is nearest to the second hologram towards a position of 20% to 50% of L2, and
wherein the grating depth of the third hologram area may gradually increase from the position at 20% to 50% of L2 towards the farthest edge against the second hologram area.

2. The image guide according to claim 1, wherein
when a first direction is defined as a direction traveling from the first hologram area to the second hologram area,
the grating depth in the second hologram area is changing along to the first direction.

3. The image guide according to claim 1, wherein
when a second direction is a direction traveling from the second hologram area to the third hologram area,
a grating depth in the third hologram area is changing along to the second direction.

4. The image guide according to claim 1, wherein
the second and third hologram areas are divided into from three to nine multiple areas, and
each multiple area has different grating depth from other adjacent sub-area.

5. The image guide according to claim 4, wherein the grating depth gradually deepens from one area of the divided second hologram area which is a closest area to the first hologram area to one area of the divided second hologram area which is a farthest area to the first hologram area.

6. The image guide according to claim 4, wherein the grating depth gradually deepens from one area of the divided third hologram area which is a closest area to the second hologram area to one area of the divided third hologram area which is a farthest area to the second hologram area.

7. The image guide according to claim 4, wherein grating depth of one area of the divided second hologram area which is a second closest area to the first hologram area is shallower than one area of the divided second hologram area which is a closest area to the first hologram area, and grating depth gradually deepens from one area of the divided second hologram area which is the second closest area to the first hologram area to one area of the divided second hologram area which is a farthest area to the first hologram area.

8. The image guide according to claim 4, wherein grating depth gradually becomes more shallow from one area of the divided second hologram area which is a closest area to the first hologram area to one area of the divided second hologram area which is center of the second hologram area, and grating depth gradually deepens from the center area of the divided second hologram area to one area of the divided second hologram area which is a farthest area to the first hologram area.

9. The image guide according to claim 4, wherein grating depth of one area of the divided third hologram area which is second closest area to the second hologram area is shallower than one area of the divided third hologram area which is a closest area to the second hologram area, and grating depth gradually deepens from one area of the divided third hologram area which is second closest area to the second hologram area to one area of the divided third hologram area which is a farthest area to the second hologram area.

10. The image guide according to claim 4, wherein grating depth gradually becomes shallower hallow from one area of the divided third hologram area which is a closest area to the second hologram area to one area of the divided third hologram area which is center of the third hologram area, and grating depth gradually deepens from the center area of the divided third hologram area to one area of the divided third hologram area which is a farthest area to the second hologram area.

11. The image guide according to claim 1, wherein the grating depths of the second and third hologram areas are chirped continuously according to position.

12. The image guide according to claim 1, wherein the image guide has a multi layered structure such that multiple image guide substrates form the first, second and third hologram areas in a stacked arrangement.

13. The image guide according to claim 1, wherein the grating depth of the second hologram area is in range of 30 nm to 120 nm, and the grating depth of the third hologram area is in range of 60 nm to 150 nm.

14. The image guide according to claim 1, wherein grating depth of the second hologram area gradually deepens along a direction from the first hologram area to the second hologram area, and grating depth of the third hologram area gradually deepens along tea direction from the second hologram area to the third hologram area.

15. The image guide according to claim 1, wherein a ratio of deepest grating depth and shallowest grating depth in the second hologram area may be within a range of 1.2 to 1.5, and a ratio of deepest grating depth and shallowest grating depth in the third hologram area may be within a range of 1.4 to 1.9.

16. The image guide according to claim 1, wherein the image guide has multiple light propagating layers, each light propagating layer has the first, second, and third hologram areas, depth of diffraction structure on the first hologram area of each light propagating layer uniform in the hologram area;

depth of diffraction structure on the second or third hologram area of each light propagating layer is chirped in the hologram area.

17. The image guide according to claim 1, wherein a ratio of the grating depth of the first hologram area on the first light propagating layer and the grating depth of the first hologram area on the second light propagating layer is within 1.28 to 1.43.

18. A head mounted display with:
the image guide according to claim 1;
a light engine to project image,
image processing unit which generate projection image signal, sound/voice processing unit recognizing and outputting sound/voice, communication unit which communicates data with external devices by wire or wireless communication,
sensing unit imaging or recognizing gesture,
a storage medium saving data, and
a control unit which controls the apparatus as a whole.

* * * * *